United States Patent
Wang et al.

(10) Patent No.: US 11,438,959 B2
(45) Date of Patent: Sep. 6, 2022

(54) POWER OPTIMIZATION FOR LAA CELLS WITHOUT NEIGHBOR CELL MEASUREMENT CONFIGURATION

(71) Applicant: APPLE INC., Cupertino, CA (US)

(72) Inventors: Beibei Wang, Cupertino, CA (US); Johnson O. Sebeni, Fremont, CA (US); Zhu Ji, San Jose, CA (US); Jia Tang, San Jose, CA (US); Yang Li, Plano, TX (US); Tianyan Pu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 19 days.

(21) Appl. No.: 15/993,934

(22) Filed: May 31, 2018

(65) Prior Publication Data
US 2019/0373668 A1    Dec. 5, 2019

(51) Int. Cl.
*H04W 76/28* (2018.01)
*H04W 16/14* (2009.01)
*H04W 28/06* (2009.01)
*H04W 72/04* (2009.01)

(52) U.S. Cl.
CPC .......... *H04W 76/28* (2018.02); *H04W 16/14* (2013.01); *H04W 28/065* (2013.01); *H04W 72/0453* (2013.01); *H04W 72/0406* (2013.01)

(58) Field of Classification Search
CPC ... H04W 76/28; H04W 16/14; H04W 28/065; H04W 72/0453; H04W 72/0406
See application file for complete search history.

(56) References Cited

U.S. PATENT DOCUMENTS

| | | | | |
|---|---|---|---|---|
| 2016/0302230 | A1* | 10/2016 | Novlan | H04L 27/0006 |
| 2017/0215222 | A1* | 7/2017 | Cheng | H04W 76/28 |
| 2019/0021052 | A1* | 1/2019 | Kadiri | H04W 76/27 |
| 2019/0313324 | A1* | 10/2019 | Dalsgaard | H04W 76/28 |

* cited by examiner

*Primary Examiner* — Kibrom T Hailu
*Assistant Examiner* — Nizam U Ahmed
(74) *Attorney, Agent, or Firm* — Fay Kaplun & Marcin, LLP

(57) ABSTRACT

A device and method for power optimization for a user equipment (UE) without neighbor cell measurement configuration. The UE may be configured with Connected Discontinuous Reception (C-DRX) functionality including a cycle with an onDuration. The UE may be configured with carrier aggregation (CA) in the unlicensed spectrum including a reference signal (DRS) monitoring timing configuration (DMTC) occasion that occurs outside of the onDuration. The UE determines at least one subframe of the onDuration for the UE to utilize an active mode of processing related to performing measurements corresponding to a cell utilizing the unlicensed spectrum. The UE determines to utilize a sleep mode of processing related to performing the measurements during the DMTC occasion based on detecting a first downlink signal transmitted by the cell during the at least one subframe of the onDuration.

20 Claims, 7 Drawing Sheets

POWER OPTIMIZATION FOR LAA CELLS WITHOUT NEIGHBOR CELL MEASUREMENT CONFIGURATION

BACKGROUND

A user equipment (UE) may be configured to establish a connection to at least one of a plurality of different networks or types of networks to perform a variety of different functionalities via the network connection. When connected to a Long Term Evolution (LTE) network, the UE and the network may utilize a carrier aggregation (CA) combination to exchange data. Certain types of CA utilize the unlicensed spectrum to provide a portion of the total bandwidth.

During the connection with the network, the UE may be configured with a specification or schedule that includes a set of active processing time periods and a set of available sleep time periods. For example, the UE may be configured with a connected discontinuous reception (C-DRX) cycle that includes onDurations during which the UE is configured to be in an active mode of processing. During a C-DRX cycle, when an onDuration is not scheduled, the UE has an opportunity to enter a sleep mode and conserve power.

The UE may be configured with both CA in the unlicensed spectrum and the C-DRX cycle simultaneously. Further, the UE may be configured with a measurement schedule that relates to measurement occasions where the UE may perform measurements related to CA in the unlicensed spectrum. During measurement occasions, the UE may be in an active mode of processing to detect particular signals transmitted over the unlicensed spectrum and perform measurements.

Due to various factors, a UE may be configured with a measurement occasion that occurs outside of an onDuration of the C-DRX cycle. Thus, despite being provided an opportunity to sleep based on the C-DRX schedule the UE may be in an active mode of processing to detect signals and perform measurements based on the measurement occasion. This increases the overall active processing time of the UE and consequently, the power consumption of the UE.

SUMMARY

According to an exemplary embodiment a method may be performed by a user equipment (UE). The UE may be connected to a primary cell of a network, the UE and the network may be configured with a Connected Discontinuous Reception (C-DRX) functionality, the C-DRX functionality including a cycle with at least one onDuration. The UE may be further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by a secondary cell on a frequency band in an unlicensed spectrum. CA in the unlicensed spectrum further including a reference signal (DRS) monitoring timing configuration (DMTC) occasion that occurs outside of the at least one onDuration. The method includes, determining, prior to the DMTC occasion, that a type of neighbor cell measurement in the unlicensed spectrum is not configured. The method further includes, determining at least one subframe of a first onDuration for the UE to utilize an active mode of processing related to performing at least one measurement corresponding to the secondary cell, wherein the DMTC occasion is subsequent to the first onDuration. The method further includes, determining to utilize a sleep mode of processing related to performing the at least one measurement during the DMTC occasion based on detecting a first downlink signal transmitted by the secondary cell during the at least one subframe of the first onDuration.

According to another exemplary embodiment, a user equipment (UE) includes a transceiver configured to establish a connection to a primary cell of a network. The UE and the network may be configured with a Connected Discontinuous Reception (C-DRX) functionality, the C-DRX functionality including a cycle with at least one onDuration. The UE may be further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by a secondary cell on a frequency band in an unlicensed spectrum. CA in the unlicensed spectrum further including a reference signal (DRS) monitoring timing configuration (DMTC) occasion that occurs outside of the at least one onDuration. The UE further including a processor configured to perform operations including determining, prior to the DMTC occasion, that a type of neighbor cell measurement in the unlicensed spectrum is not configured. The operations further include, determining at least one subframe of a first onDuration for the UE to utilize an active mode of processing related to performing at least one measurement corresponding to the secondary cell, wherein the DMTC occasion is subsequent to the first onDuration. The operations further include, determining to utilize a sleep mode of processing related to performing the at least one measurement during the DMTC occasion based on detecting a first downlink signal transmitted by the secondary cell during the at least one subframe of the first onDuration.

According to a further exemplary embodiment, a user equipment (UE) includes a transceiver configured to establish a connection to a primary cell of a network. The UE and the network may be configured with a Connected Discontinuous Reception (C-DRX) functionality, the C-DRX functionality including a cycle with at least one onDuration. The UE may be further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by a secondary cell on a frequency band in an unlicensed spectrum. CA in the unlicensed spectrum further including a reference signal (DRS) monitoring timing configuration (DMTC) occasion that occurs outside of the at least one onDuration. The UE further including a processor configured to perform operations including determining, prior to the DMTC occasion, that a type of neighbor cell measurement in the unlicensed spectrum is not configured. The operations further include, detecting one of a DRS broadcasted by the secondary cell or a downlink signal transmitted by the secondary cell during a first subframe of the DMTC occasion. The operations further include initiating a sleep mode of processing related to performing at least one measurement corresponding to the secondary cell during the DMTC occasion based on detecting the one of the DRS or the downlink signal during the first subframe.

DETAILED DESCRIPTION

Figure 1:
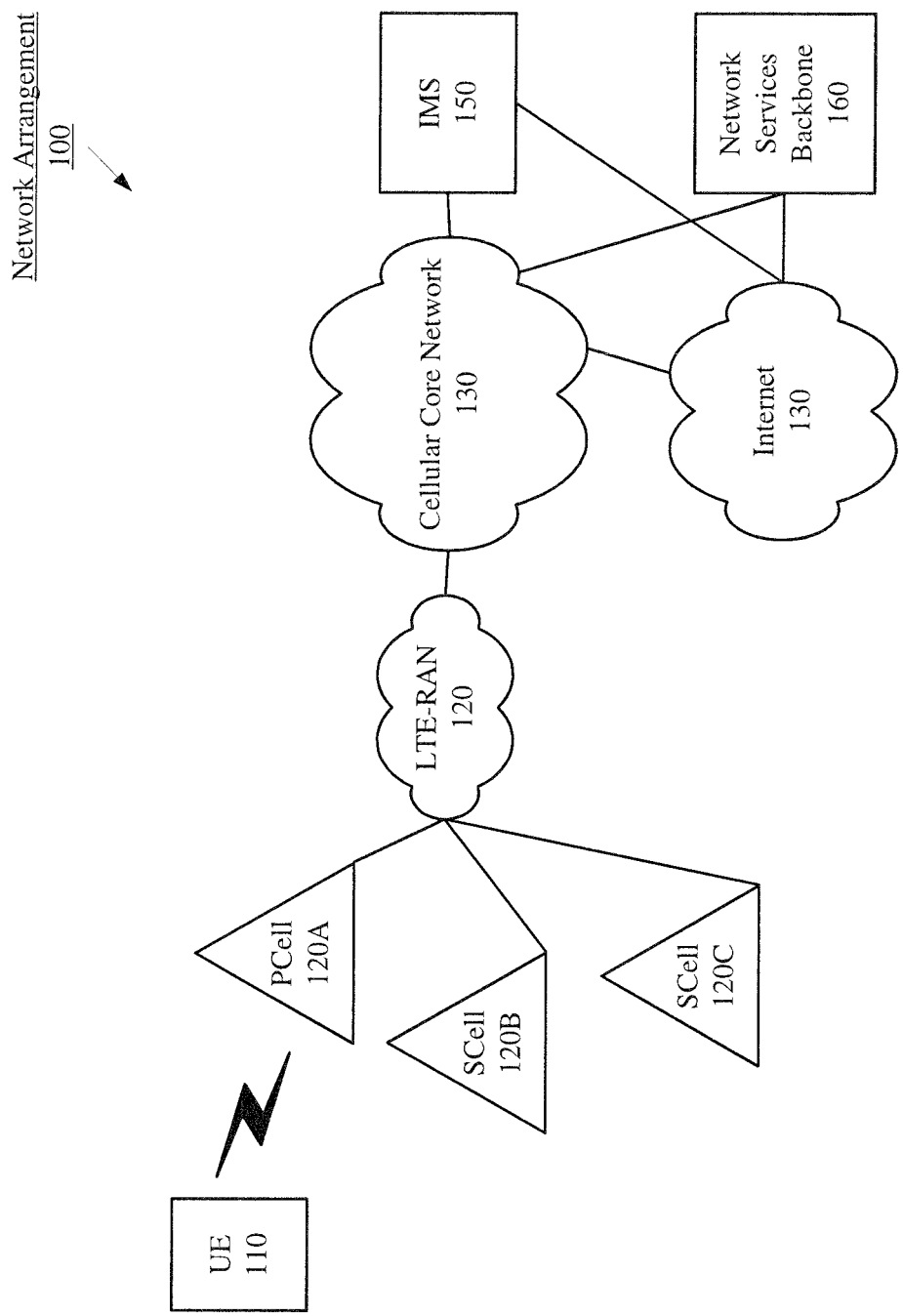
FIG. 1 shows an exemplary network arrangement according to various exemplary embodiments described herein.

The exemplary embodiments may be further understood with reference to the following description and the related appended drawings, wherein like elements are provided with the same reference numerals. The exemplary embodiments are related to a device, system and method for power optimization related to measurements performed by a user equipment (UE) configured with carrier aggregation (CA) in the unlicensed spectrum. Specifically, the exemplary embodiments may relate to reducing the active processing time of the UE by limiting when the UE is in an active mode of processing to detect signals and perform measurements related to CA in the unlicensed spectrum.

Initially, it is noted that the exemplary embodiments are described with regard to a UE. However, the use of a UE is merely for illustrative purposes. The exemplary embodiments may be utilized with any electronic component that may establish a connection with a network and configured with the hardware, software, and/or firmware to exchange information and data with the network. Therefore, the UE as described herein is used to represent any electronic component.

Further, it is noted that the exemplary embodiments are described with regard to the cellular network being a Long Term Evolution (LTE) network with LAA functionality that may utilize the unlicensed spectrum (e.g. 5 GHz) to exchange data with the UE. A person of ordinary skill in the art would understand that LAA is a subset of CA. It should be noted that reference to LAA is merely exemplary and the exemplary embodiments may apply to any type of network that implements CA utilizing the unlicensed spectrum.

During operation, the UE and the network may exchange information for the purposes of radio resource management (RRM). RRM may relate to how the network configures the radio frequency resources and the network infrastructure. For example, the UE may be configured to detect signals, perform measurements and report the measurements to the network. The network may utilize these measurements to determine how the network will allocate the use of the spectrum, manage interference, ensure connection quality, etc. It should be noted that exemplary embodiments are described with regard to control channel information and data being exchanged for the purposes of RRM via frames containing subframes numbered 0-9. Thus, the network may transmit a first frame containing subframe 0, subframe 1, subframe 2, subframe 3, subframe 4, subframe 5, subframe 6, subframe 7, subframe 8 and subframe 9 at a first time and may transmit a second frame with subframes 0-9 at a second time. However, a configuration of frames and subframes in this manner is merely for illustrative purposes and the exemplary embodiments may apply to the exchange of data and control channel information in any configuration related to frequency and time.

A UE connected to the LTE network may utilize a predetermined manner of receiving the control channel information. For example, a discontinuous reception (DRX) functionality, such as a cycle associated with a connected DRX (C-DRX) functionality may be used. The C-DRX cycle relates to utilizing an active mode of data exchange processing and a sleep mode of inactivity to conserve power. The C-DRX may include a specification or schedule in which the control channel information is received. Therefore, the UE may use the active mode of processing at defined intervals to perform scheduled operations such as performing measurements related to the network conditions, transmitting (e.g., requests, measurement reports, uplink data etc.) and receiving (e.g. control channel information, reference signals, synchronization signals, downlink data, etc.). The time period that the UE may be scheduled to receive control channel information may be termed the onDuration for the C-DRX cycle. The onDuration relates to a duration over which the UE may perform operations that enable the UE to receive data that may be transmitted to the UE such as but not limited to, control channel information, uplink grant, downlink grant, reference signals, synchronization signals, payload data etc. For instance, during the onDuration the UE may tune its transceiver to the downlink control channel to detect transmissions from the network. During the C-DRX cycle, when an onDuration is not scheduled the UE may have an opportunity to utilize the sleep mode of inactivity based on the C-DRX cycle.

The C-DRX cycle may have a predetermined duration N such as 40 milliseconds (ms), 20 ms, etc. For example, at a time 0, there may be a onDuration during which the active mode of processing is used. Subsequently, upon the conclusion of the onDuration, the UE has an opportunity to utilize the sleep mode of inactivity. Then at a time N, there may be another onDuration. Subsequently, the sleep mode is used until a time 2N. This process continues for the duration of the C-DRX cycle. It should be noted that a C-DRX cycle being configured in ms units is merely for illustrative purposes, the exemplary embodiments may utilize a DRX cycle that is based on subframes or any other suitable unit of time.

A UE may be configured with both LAA and a C-DRX cycle. During LAA, discovery reference signals (DRS) may be transmitted by network components (e.g., a base station) to the UE. The DRS may include control channel information that the UE may detect and measure. Further, the DRS may be transmitted periodically for a predetermined duration, which may be referred to as a DRS measurement timing configuration (DMTC) occasion. When configured with DMTC occasions the UE may enter an active mode of processing to perform measurements related to the DRS. For example, a DMTC occasion may occur for a 6 ms duration periodically every 40 ms, 80 ms, 160 ms, etc. It should be noted that a DMTC cycle being configured in ms units is merely for illustrative purposes, the exemplary embodiments may utilize a measurement schedule and DMTC occasions that are based on subframes or any other suitable unit of time.

It is noted that the exemplary embodiments are described herein with regard to the LTE network in which C-DRX functionality and LAA may be configured. However, those skilled in the art will understand that the functionalities described herein may be applied to other network arrangements and configurations. For example, other networks such as 5G networks may utilize a discontinuous reception cycle similar to C-DRX and CA in the unlicensed spectrum similar to LAA. Thus, the functionalities described herein may also be implemented for UEs that connect to 5G networks or other networks implementing a similar functionality.

The UE may be configured with a DMTC occasion that occurs outside of an onDuration. Thus, despite being provided an opportunity to sleep based on the C-DRX cycle, the UE may enter an active mode of processing based on the scheduled DMTC occasion. This increases the overall active processing time for the UE and consequently, the power consumption.

A person of ordinary skill in the art will understand that an active mode of processing for the reception of data and/or control channel information transmitted to the UE may include operations such as the UE powering on its receiver and tuning the receiver to select channels to listen for transmissions to the UE. Measurements may be performed on the data and/or control channel information transmitted to the UE. It will be further understood, that reference to a sleep mode of processing, etc. may include operations such as the UE powering down its receiver and not listening for transmissions to the UE. The active mode of processing and the sleep mode of processing may also include other operations and the turning on/off of the receiver should be understood to only be exemplary of operations that may be performed in these modes.

Throughout this description, the control channel information that is transmitted to the UE via the control channel may be generally referred to as control channel information or may also refer to the specific type of information that is transmitted, e.g., DRS, a reference signal, synchronization signal, etc. The information that is transmitted to the UE via the data channel may be referred to generally as data or the specific type of payload data. In addition, when referring generally to any downlink information (control or data channel) or any uplink information the term data may also be used.

The exemplary embodiments may relate to decreasing the active processing time of the UE when the UE is configured with a DMTC occasion that occurs outside of an onDuration. Some exemplary embodiments may relate to performing measurements during the onDuration preceding a DMTC occasion. Based on these measurements, the UE may determine whether it may forgo performing measurements during the DMTC occasion. Some exemplary embodiments may relate to measurements performed during the DMTC occasion and entering a sleep mode of processing prior to the completion of the DMTC occasion.

FIG. 1 shows an exemplary network arrangement 100 according to the exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to connect to and communicate with one or more networks. The exemplary embodiments will be described with regard to the network being an LTE radio access network (LTE-RAN 120) that has LAA functionality. However, the use of an LTE-RAN 120 is merely exemplary and the exemplary embodiments may apply to any network that may utilize CA in the unlicensed spectrum (e.g. 5G New Radio (NR)) to communicate with the UE 110 or any network that may communicate with the UE 110 in the unlicensed spectrum. Therefore, the UE 110 may have an LTE chipset to communicate with the LTE-RAN 120.

The LTE-RAN 120 is a portion of cellular networks that may be deployed by cellular providers (e.g., Verizon, AT&T, Sprint, T-Mobile, etc.). LTE-RAN 120 may include, for example, base stations (Node Bs, eNodeBs, HeNBs, eNBS, gNBs, small cells, femtocells, picocells, microcells, etc.) that are configured to send and receive traffic from UEs that are equipped with the appropriate cellular chip set.

The UE 110 may connect to LTE-RAN 120 via a primary cell (e.g., PCell 120A). Those skilled in the art will understand that the term primary cell is typically associated with the CA functionality currently being used. Thus, upon first connecting, the PCell 120A may not be assigned the primary role until CA functionality is used. In addition, any association procedure may be performed for the UE 110 to connect to the LTE-RAN 120 via the PCell 120A. For example, as discussed above, the LTE-RAN 120 may be associated with a particular cellular provider where the UE 110 and/or the user thereof has a contract and credential information (e.g., stored on a SIM card). Upon detecting the presence of the LTE-RAN 120, the UE 110 may transmit the corresponding credential information to associate with the LTE-RAN 120. More specifically, the UE 110 may associate with a specific access point (e.g. PCell 120A). As mentioned above, the use of the LTE-RAN 120 is for illustrative purposes and any type of network that utilizes the unlicensed spectrum to exchange data with the UE 110 may be used.

The PCell 120A may control the mechanism used in exchanging data, particularly how data is transmitted to and received by the UE 110. When the UE 110 is CA capable, CA functionality enables the PCell 120A to combine bandwidths with at least one further base station to exchange data with the UE 110. The PCell 120A may be any type of LTE base station that communicates with the UE 110 in the licensed spectrum. Thus, with CA the PCell may provide a first portion of a total bandwidth for data to be exchanged while the at least one further base station may provide a second portion of the total bandwidth.

The network arrangement 100 may utilize LAA. Those skilled in the art would understand that License Assisted Access (LAA) is a type of CA where the at least one further base station (e.g. SCell 120B) operates in the unlicensed spectrum. For example, the PCell 120A may provide a first component carrier of a first bandwidth representing a primary component carrier (PCC) operating on a first frequency band in the licensed spectrum while the SCell 120B may provide a second component carrier of second bandwidth representing the secondary component carrier (SCC) operating on a second frequency band in the unlicensed spectrum. Accordingly, PCell 120A provides a first bandwidth in the licensed band and SCell 120B provides a second bandwidth in the unlicensed band to provide the total bandwidth for the UE 110. It is noted that reference to a single SCell 120B is merely exemplary and LAA functionality typically uses at least one SCell that operates in the unlicensed spectrum. Thus, the network arrangement 100 has a minimum of a single SCell operating in the unlicensed spectrum (e.g. SCell 120B) and may include a plurality of further SCells (not pictured) operating in either the licensed or unlicensed bands. Additionally, the LAA functionality may be performed in both the uplink and the downlink. Thus, the UE 110 may communicate with SCell 120B in the unlicensed spectrum in both the uplink and downlink.

The SCell 120B may be an eNB modified to operate in the unlicensed spectrum, a small cell, a femtocell, a picocell, a microcell etc. Thus, the SCell 120B may be any type of base station that may communicate with the UE 110 in the unlicensed spectrum. Utilizing LAA, the SCell 120B may communicate over the 5 GHz band (e.g. Band 46) in the unlicensed spectrum. It should also be noted that a single base station may include PCell 120A and SCell 120B. That is, a single base station may have a first connection to the UE 110 and provide a first portion of the total bandwidth to the UE 110 in the licensed band. Further, the single base station may have a second connection to the UE 110 and provide the second portion of the total bandwidth to the UE 110 in the unlicensed spectrum, e.g., a single base station may have multiple cells.

It should be noted that a base station that provides the UE 110 with bandwidth over the unlicensed spectrum (e.g. SCell 120B) may be referred to as an LAA serving cell. Further, a base station that may utilize the unlicensed spectrum but is not currently providing bandwidth to the UE 110 may be referred to as an LAA neighbor cell (e.g. SCell 120C). The use of a single LAA neighbor cell (e.g. SCell 120C) is merely exemplary, a network arrangement may include any number of LAA neighbor cells.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
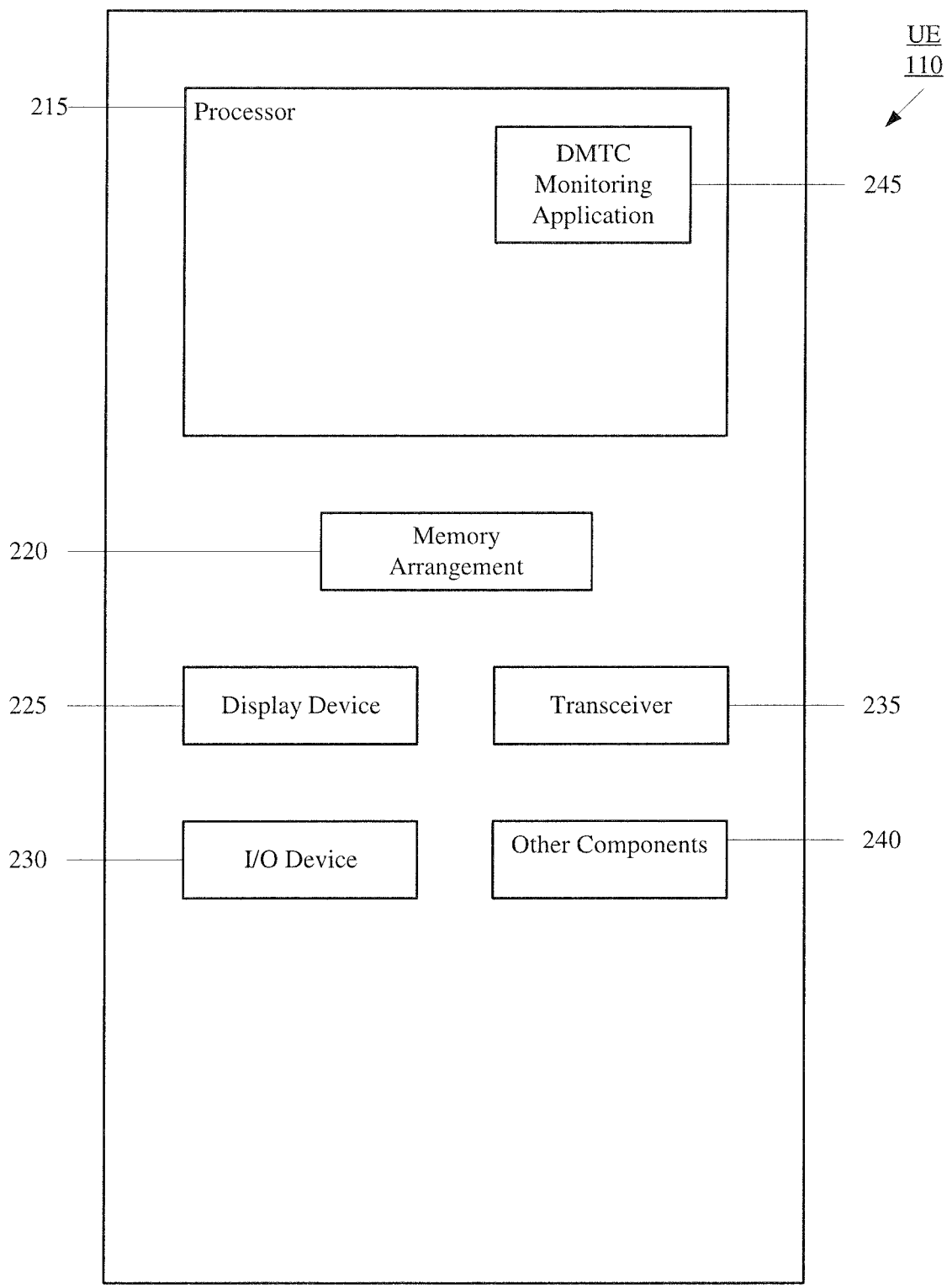
FIG. 2 shows a UE according to various exemplary embodiments described herein.

FIG. 2 shows a UE 110 according to various exemplary embodiments. The UE 100 may be configured with CA in the unlicensed spectrum to exchange data with the LTE-RAN 120. The UE 110 may represent any electronic device that is configured to perform wireless functionalities, examples of which were provided above. In another example, the UE 110 may be a stationary device such as a desktop terminal. The UE 110 may include a processor 215, a memory arrangement 220, a display device 225, an input/output (I/O) device 230, a transceiver 235, and other components 240. The other components 240 may include, for example, an audio input device, an audio output device, a battery, a data acquisition device, ports to electrically connect the UE 110 to other electronic devices, etc.

The processor 215 may be configured to execute a plurality of applications. For example, the processor 215 may execute a web browser when connected to a communication network (e.g. LTE-RAN 120) via the transceiver 235. Further, the processor 215 may execute a DMTC monitoring application 245 that may be configured to perform operations, including but not limited to, determining when a DMTC occasion is to occur, determining measurements to perform during the DMTC occasion, determining whether the UE 110 may forgo entering an active mode of processing during a DMTC occasion, detecting various types of data during a DMTC occasion, determining whether the UE 110 may enter a sleep mode of processing prior to the end of the DMTC occasion, etc. Each of the operations will be described in greater detail below. The DMTC monitoring application 245 may be executed in the background relative to the user and may be automatically executed at any point when connected to a network.

It should be noted that the above identified application being an application (e.g., program) executed by the processor 215 is only exemplary. The application may also be represented as components of one or more multifunctional programs, a separate incorporated component of the UE 110 or may be a modular component coupled to the UE 110, e.g., an integrated circuit with or without firmware. In addition, in some UEs there are multiple processors, e.g., a baseband processor and an application processor. The functionality described with regard to the processor 215 may be performed by a baseband processor or an application processor. The exemplary embodiments may be implemented in any of these or other configurations of a UE. Further, it should be noted that DMTC monitoring application 245 does not need to be executed by the processor 215. The functionality that is described herein for the DMTC monitoring application 245 may be performed by the transceiver 235 executing firmware stored on an integrated circuit of the transceiver 235.

The memory arrangement 220 may be a hardware component configured to store data for the UE 110. Specifically, the memory arrangement 220 may store data such as, but not limited to, voice transmissions, control channel information, measurements, a schedule related to a C-DRX cycle, a schedule related to DMTC occasions, etc. The display device 225 may be a hardware component configured to show data to a user while the I/O device 230 may be a hardware component that enables the user to enter inputs. It should be noted that the display device 225 and the I/O device 230 may be separate components or integrated together such as a touchscreen.

The transceiver 235 may be a hardware component configured to transmit and/or receive data. The transceiver 235 may enable communication with other electronic devices directly or indirectly through a network based upon an operating frequency of the network. The transceiver 235 may operate on a variety of different frequencies or channels (e.g., set of consecutive frequencies). Thus, an antenna (not shown) coupled with the transceiver 235 may enable the transceiver 235 to operate on the various frequencies. The transceiver 235 may be used to receive data from and transmit data to the LTE-RAN 120. In a first example, control channel information may be received from the PCell 120A via the transceiver 235 during an onDuration as indicated by the C-DRX cycle. In a second example, DRS may be received from a cell operating in the unlicensed spectrum via the transceiver 105 during a DMTC occasion outside of an onDuration. It should be noted these examples and configurations are merely provided for illustrative purposes and the transceiver 125 of the UE 110 may exchange data with the network in any appropriate manner.

As mentioned above, the UE 110 may establish a connection with the LTE-RAN 120 and be configured with a C-DRX cycle and LAA. Radio resource management (RRM) for LAA may include detecting discovery reference signals (DRS), performing measurements based on the DRS and reporting the results of the measurements to the LTE-RAN 120.

As described above, the DRS may be transmitted periodically for a predetermined duration, which may be referred to as the DMTC occasion. For example, a DMTC occasion may be configured for 6 subframe intervals that occur periodically. DRS is a particular kind of reference signal that is transmitted by cells that utilize LAA. It should be noted, reference to DRS is merely for illustrative purposes and the exemplary embodiments may apply to any reference signal that a cell that utilizes CA in the unlicensed spectrum may transmit for the purposes of RRM.

When configured with DMTC occasions the UE 110 may enter an active mode of processing to detect and perform measurements related to the DRS. For instance, cells in the unlicensed spectrum may be configured to broadcast control channel information during the DMTC occasion. Accordingly, the UE 110 may tune its receiver to listen for control channel information (e.g. DRS) that is transmitted by a cell over the unlicensed spectrum based on the scheduled DMTC occasion. Outside of a DMTC occasion the UE 110 may conserve power by not tuning its transceiver to listen for control channel information over the unlicensed spectrum. The DRS may include, but is not limited to, cell-specific reference signals (CRS), channel state information reference signal (CSI-RS) and synchronization signals (e.g. primary synchronization signals (PSS) and secondary synchronization signals (SSS). The UE 110 may receive the DRS, decode the corresponding reference and/or synchronization signals and generate measurements to be reported to the LTE-RAN 120 for the purposes of RRM. Based on the CRS, the UE 110 may measure certain signal quality parameters such as the reference signal received power (RSRP) and reference signal received quality (RSRQ). Based on the CSI-RS, the UE 110 may perform CSI-RS based RSRP measurements. The PSS and the SSS may be used for cell detection and measurements. It should be noted that reference to RRM, DMTC, DRS, CRS, CSI-RS, PSS and SSS is merely provided for illustrative purposes. The exemplary embodiments may apply to detecting and measuring any type of control channel information and/or data related to CA in the unlicensed spectrum.

Based on the above measurements, the UE 110 and the LTE-RAN 120 may configure which cells may provide a connection for the UE 110 (e.g. serving cells). Thus, based on these measurements the UE 110 may perform cell selection and cell re-selection. Cell selection and re-selection may apply to a primary cell, a secondary cell, a cell that utilizes the licensed spectrum or a cell that utilizes the unlicensed spectrum.

It should be noted that the UE 110 may detect DRS from a serving cell, from a secondary cell, from a neighbor cell, or any other cell that utilizes CA in the unlicensed spectrum. For instance, consider that the SCell 120B is a LAA serving cell for the UE 110. During the DMTC occasion, the SCell 120B may broadcast control channel information (e.g. DRS) to enable the UE 110 to perform RRM measurements on the SCell 120B. Also during the DMTC occasion, other cells such as SCell 120C that utilizes CA in the unlicensed spectrum (e.g. LAA neighbor cells) will also be broadcasting DRS to enable UEs to detect and measure the corresponding cell that utilize CA in the unlicensed spectrum. However, depending on various factors, including but not limited to, the type of UE 110, the network arrangement, the network conditions, the movement of the UE 110, interference etc., the UE 110 may not be configured to perform measurements on neighbor cells that utilize LAA. Alternatively, the UE 110 may determine not to perform measurements on neighbor cells that utilize LAA. For example, some types of UEs may not be configured to perform intra-frequency measurements for LAA. Thus, when the UE 110 is connected to a serving cell that is utilizing the unlicensed spectrum, the UE 110 may not be configured to perform measurements on neighbor cells that utilize the same frequency band. Alternatively, the UE 110 may be configured to perform intra-frequency measurements for LAA but based on determining that a predetermined condition has been satisfied, the UE 100 may decide not to perform intra-frequency measurements for LAA.

Since the UE 110 may be configured with C-DRX and LAA at the same time, the UE 110 be configured with a DMTC window and an onDuration that overlap. Thus, the UE 110 may perform operations related to the onDuration and operations related to the DMTC occasion at the same time. However, the UE 110 may also be configured with a DMTC window that occurs outside of an onDuration. When the UE 110 is configured with a DMTC window outside of the onDuration, the active processing time of the UE 110 increases because the UE 110 is in an active mode of processing based on the C-DRX cycle for a first duration and subsequently, the UE 110 is in an active mode of processing based on the DMTC occasion for a second duration. Thus, when a DMTC occasion occurs outside of an onDuration, power consumption by the UE 110 increases because instead of taking advantage of the opportunity to sleep based on the C-DRX cycle, the UE 110 tunes its receiver and listens for control channel information that is broadcasted during the DMTC occasion.

Figure 3:
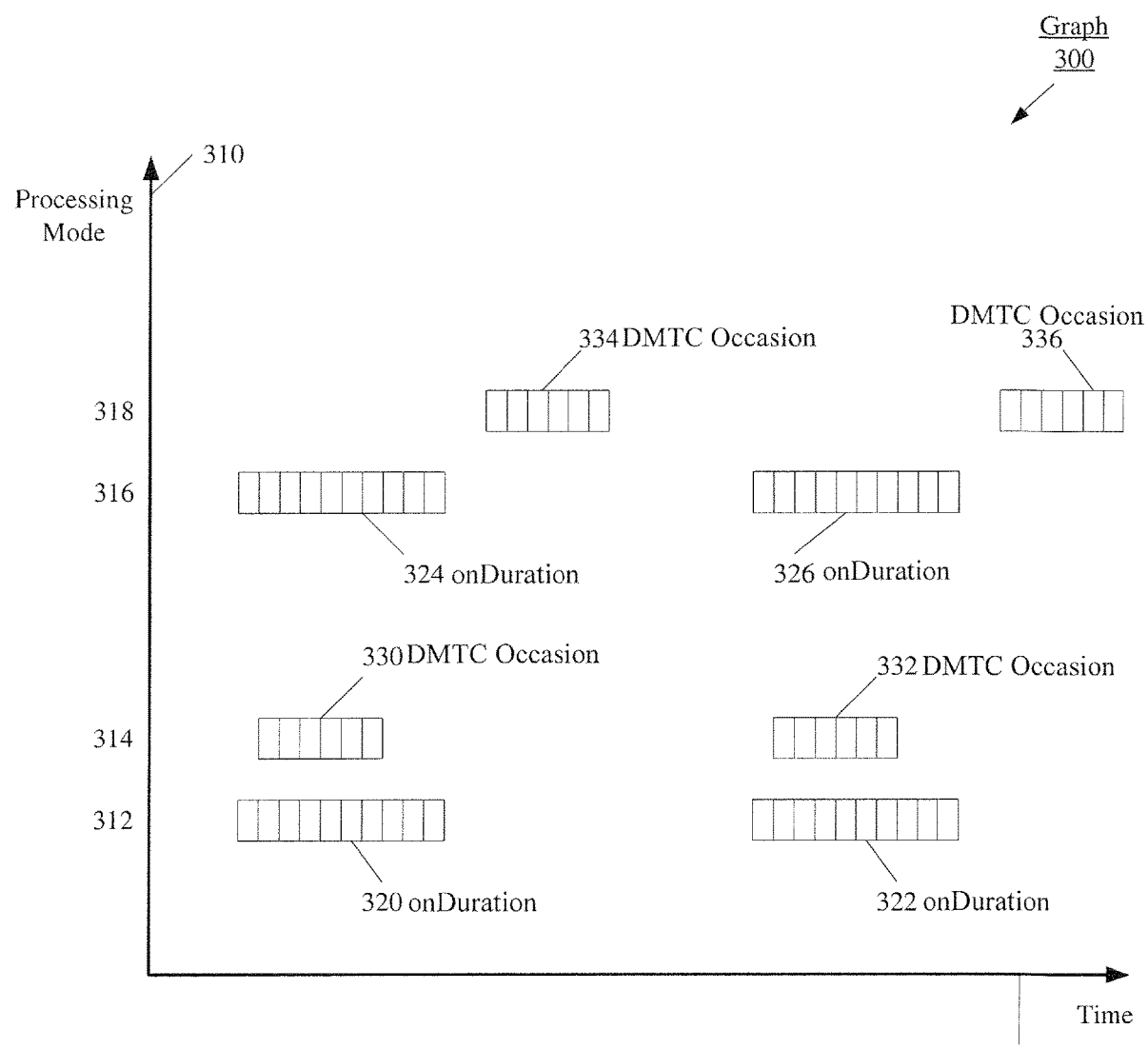
FIG. 3 shows a graph that provides an example of when the UE is in an active mode of processing according to various exemplary embodiments described herein.

FIG. 3 shows a graph 300 that provides an example of when the UE 110 is in an active mode of processing according to various exemplary embodiments. Specifically, the graph 300 demonstrates when the UE 110 is in an active mode of processing during a first configuration where the onDurations and the DMTC occasions overlap and during a second configuration where the DMTC occasions occur outside of the onDurations.

The x-axis 305 of the graph 300 represents time. The y-axis 310 provides points 312 and 314 that relate to an active mode of processing for a first configuration and points 316 and 318 relate to an active mode of processing for a second configuration. Time periods that illustrate an active mode of processing are represented by blocks plotted along the x-axis 305 at points 312, 314, 316, 318 of the y-axis 310. Each block represents a subframe. It should be noted that the configurations provided in the graph 300 are merely for illustrative purposes and the exemplary embodiments may relate to onDurations and DMTC occasions being configured in any manner.

The first configuration relates to when an onDuration and a DMTC occasion overlap. Specifically, when blocks are plotted along the x-axis 305 at point 312 of the y-axis 310, the UE 110 is utilizing an active mode of processing based on the C-DRX cycle. When blocks are plotted along the x-axis 305 at point 314 of the y-axis 310 the UE 110 is utilizing an active mode of processing based on the DMTC occasions. Thus, the blocks plotted along the x-axis 305 at point 312 of the y-axis 310 illustrate that the UE 110 is utilizing an active mode of processing based on a first onDuration 320 of ten subframes and a second onDuration 322 of ten subframes. The blocks plotted along the x-axis 305 at point 314 of the y-axis 310 illustrate that the UE is utilizing an active mode of processing based on a first DMTC occasion 330 of six subframes and a second DMTC occasion 332 of six subframes. The first DMTC occasion 330 occurs during a portion of the first onDuration 320 and the second DMTC occasion 332 occurs during a portion of the second onDuration 322. Therefore, since the DMTC occasions 330, 332 occur during the onDurations 320, 322, respectively, the first configuration illustrates that during the time represented on the graph 300 the UE 110 is in an active mode of processing for a total of 20 subframes.

The second configuration relates to when a DMTC occasion occurs outside of an onDuration. Specifically, when blocks are plotted along the x-axis 305 at point 316 of the y-axis 310, the UE 110 is utilizing an active mode of processing based on the C-DRX cycle. When blocks are plotted along the x-axis 305 at point 318 of the y-axis 310 the UE 110 is utilizing an active mode of processing based on the DMTC occasions. Thus, the blocks plotted along the x-axis 305 at point 316 of the y-axis 310 illustrate that the UE 110 is utilizing an active mode of processing based on a first onDuration 324 of ten subframes and a second onDuration 326 of ten subframes. The blocks plotted along the x-axis 305 at point 314 of the y-axis 310 illustrate that the UE is utilizing an active mode of processing based on a first DMTC occasion 334 of six subframes and a second DMTC occasion 336 of six subframes. The first DMTC occasion 334 and the second DMTC occasion 336 both occur outside of the first onDuration 324 and the second onDuration 326. Therefore, since the DMTC occasions 334, 336 occur outside of the onDurations 324, 326, the second configuration illustrates that during the time represented on the graph 300 the UE 110 is in an active mode of processing for a total of 32 subframes.

The exemplary embodiments may be described as relating to configurations, similar to the second configuration of the graph 300, where at least one DMTC occasion occurs outside of an onDuration. However, this is merely exemplary and the exemplary embodiments may apply to any configuration where at least one subframe of a DMTC occasion occurs outside of an onDuration.

Further, as mentioned above, in certain scenarios, the UE 110 may not be configured to perform measurements on neighbor cells that utilize the unlicensed spectrum (e.g., LAA neighbor cells). This may be based on the type of UE or the UE 110 may determine, based on one or more predetermined conditions, not to perform measurements on neighbor cells that utilize the unlicensed spectrum. For instance, consider that the UE 110 is currently connected to the LTE-RAN 120 and configured with CA in the unlicensed spectrum. The PCell 120A may coordinate the CA and utilize bands in the licensed spectrum to provide control channel information and/or data to the UE 110. The SCell 120B may utilize bands in the unlicensed spectrum to provide control channel information and/or data to the UE 110. In this exemplary scenario, the UE 110 and the LTE-RAN 120 will communicate for the purposes of RRM. This may include the LTE-RAN 120 transmitting and/or broadcasting control channel information and/or data to the UE 110, the UE 110 performing measurements and subsequently, the UE 110 transmitting a measurement report to the LTE-RAN 120. Conventionally, RRM may include measurements related to serving cells in both the licensed and unlicensed spectrum (e.g. PCell 120A and SCell 120B, respectfully) and neighbor cells (e.g. SCell 120C) in both the licensed and unlicensed spectrum. Thus, cells that utilize the unlicensed spectrum may broadcast DRS during DMTC occasion so the UE 110 may detect the corresponding cell and perform measurements for RRM.

The exemplary embodiments relate to minimizing the power consumption of the UE 110 when the UE 110 is configured with a DMTC occasion that occurs outside of an onDuration and configured not to measure neighbor cells that utilize the unlicensed spectrum. The exemplary embodiments may decrease the active processing time of the UE 110 when the UE 110 is configured with a DMTC occasion that occurs outside of an onDuration.

Consider the second configuration of the graph 300. In a legacy mode of DMTC monitoring, the UE 110 does not perform any processing related to measuring any LAA cells during the onDuration. For example, the UE 110 will not perform any measurements related to RRM with respect to any LAA serving cells or LAA neighbor cells. When the DMTC occasion occurs, in the legacy mode of DMTC monitoring, the UE 110 will perform processing related measuring LAA cells for every subframe that occurs during the DMTC monitoring occasion. For example, the UE 110 will tune its receiver and listen for DRS to perform measurements related to the LAA cells during each of the six subframes that occur during the DMTC occasion.

Some exemplary embodiments may relate to performing RRM measurements related to the serving cell utilizing the unlicensed spectrum (e.g. LAA serving cell) during the onDuration preceding a DMTC occasion. Based on these measurements, the UE 110 may determine whether it may forgo performing measurements during the DMTC occasion. Thus, the exemplary embodiments may provide DMTC monitoring that results in power saving over the legacy DMTC monitoring because the exemplary embodiments may not utilize an active mode of processing for measurements during the DMTC occasion. For instance, the UE 110 may determine that RRM measurements for the LAA serving cell in the unlicensed spectrum are complete and since no neighbor cells in the unlicensed spectrum are to be measured, the UE 110 may forgo listening for DRS in the DMTC occasion because no further RRM measurements are needed for RRM requirements.

Some exemplary embodiments may relate to the UE 110 performing RRM measurements during the DMTC occasion and entering a sleep mode of processing prior to the completion of the DMTC occasion. Thus, the exemplary embodiments may provide DMTC monitoring that results in power saving over the legacy DMTC monitoring because the exemplary embodiments may not utilize an active mode of processing for measurements during every subframe within the DMTC occasion. For instance, in a first example, the UE 110 may tune its receiver to listen for DRS broadcasted by the serving cell during the DMTC occasion. After the serving cell DRS (e.g. SCell 120C) has been detected, the UE 110 may utilize a sleep mode of processing by tuning its receiver to no longer listen for control channel information during the DMTC. Thus, the UE 110 may limit how many subframes during the DMTC the UE 110 will be in an active mode of processing to perform measurements. In a second example, the UE 110 may detect control channel information and/or data transmitted by the serving cell to other UEs. The UE 110 may measure the control channel information and/or data transmitted by the serving cell to other UEs. Based on these measurements, the UE 110 may utilize a sleep mode of processing by tuning its receiver to no longer listen for control channel information and/or data during the DMTC. Thus, the UE 110 may limit how many subframes during the DMTC the UE 110 will be in an active mode of processing to perform measurements.

Therefore, the exemplary embodiments may provide selective DMTC monitoring that offers power saving over the legacy mode of DMTC monitoring because the UE 110 will limit its active mode of processing to perform LAA measurements to a number of subframes that is less than number of subframes that occur during a DMTC occasion.

Figure 4:
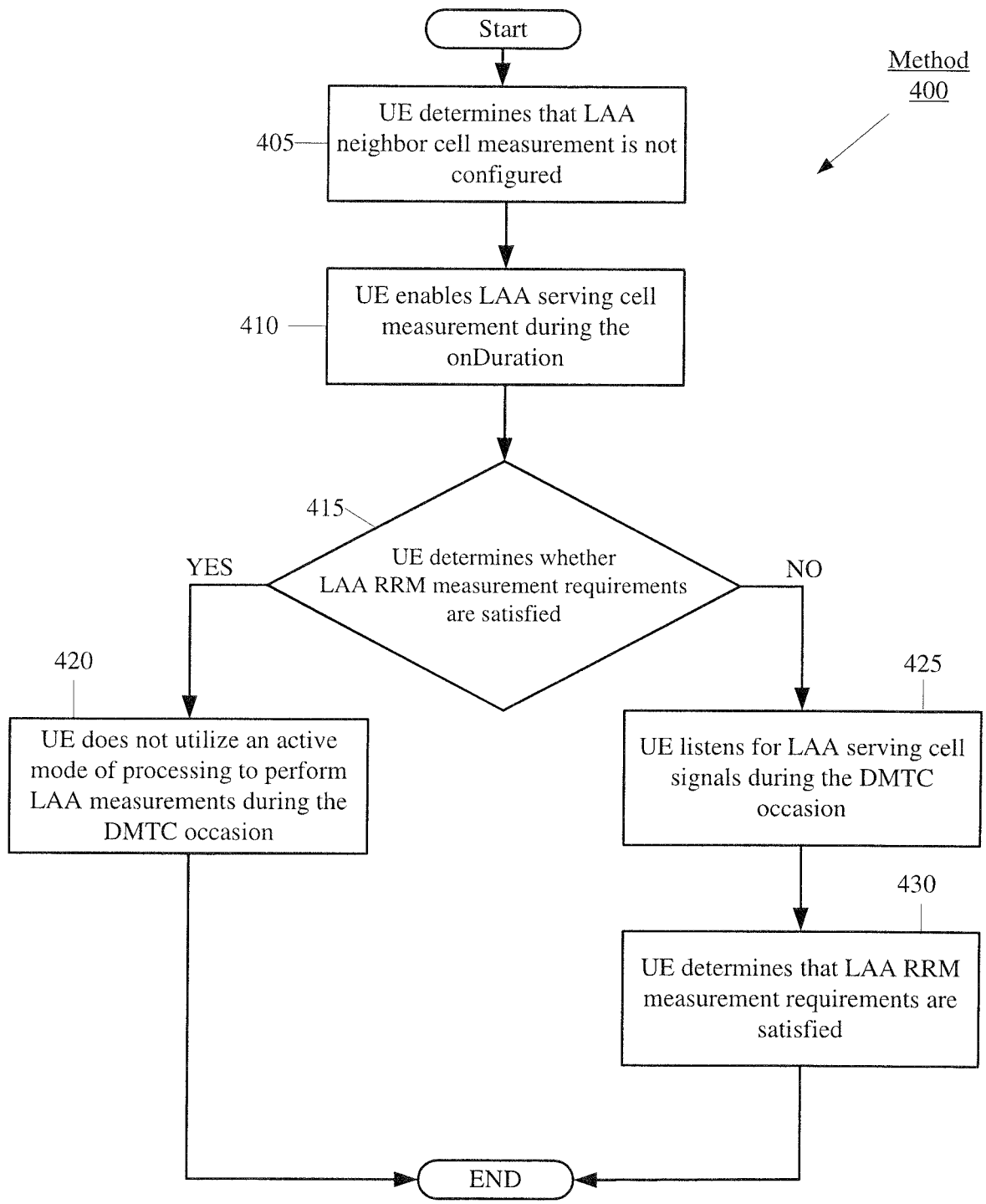
FIG. 4 shows a method that relates to minimizing power consumption of the UE when the UE is configured with a DMTC occasion that occurs outside an onDuration according to various exemplary embodiments described herein.

FIG. 4 shows a method 400 that relates to minimizing power consumption of the UE 110 when the UE 110 is configured with a DMTC occasion that occurs outside an onDuration according to various exemplary embodiments. The method 400 will be described with regard to the network arrangement 100 and the UE 110.

It is to be considered that the UE 110 is configured with at least one DMTC occasion that occurs entirely outside of an onDuration. However, this is merely exemplary and the method 400 may apply to a configuration where at least one subframe of a DMTC occasion occurs outside of an onDuration. Further, it is to be considered that the UE 110 is currently connected to the LTE-RAN 120 and is configured with CA in the unlicensed spectrum where the PCell 120A communicates with the UE 110 over the licensed spectrum and the SCell 120B communicates with the UE 110 over the unlicensed spectrum. However, this is merely exemplary and the method 400 may apply to any CA combination where at least one cell communicates with the UE 110 over the unlicensed spectrum.

In 405, the UE 110 determines that LAA neighbor cell measurement is not configured. For instance, the type of UE 110 may not be configured to perform intra-frequency neighbor cell measurements. Thus, when the UE 110 is provided with a serving cell in the unlicensed spectrum (e.g. SCell 120B), the UE 110 is configured with a setting that does not allow other cells that occupy the same unlicensed band to be measured. The setting may be based on user input or may be set by the network, the manufacturer, the operating system, etc. Alternatively, due to a variety of factors, such as but not limited to, network load, location of the UE 110, network infrastructure, etc. the UE 110 may determine not to perform intra-frequency neighbor cell measurements for cells that utilize the unlicensed spectrum.

In 410, the UE 110 enables LAA serving cell measurements during the onDuration. For instance, the UE 110 may determine at least one subframe where the UE 110 will listen for downlink traffic from the LAA serving cell (e.g. SCell 120B) to perform measurements. The downlink traffic from the LAA serving cell may be control channel information and/or data intended for the UE 110 or other UEs. How the UE 110 performs measurements of the LAA serving cell during the onDuration will be discussed in further detail below with regard to the method 600.

In 415, the UE 110 determines whether LAA RRM measurement requirements are satisfied. For instance, LAA RRM measurement requirements may include factors such as but not limited to, reference signal received power (RSRP), reference signal received quality (RSRQ), CSI-RS based RSRP measurements and measurements based on PSS and SSS. A single factor or a combination of factors may provide the basis for a predetermined condition related to RRM measurement requirements. Satisfaction of the predetermined condition may indicate to the UE 110 that RRM measurement requirements are satisfied. It should be noted that these types of measurements are merely provided for illustrative purposes. LAA RRM measurement requirements may be carrier specific and different networks may refer to similar measurements in a different manner. The exemplary embodiments may apply to any measurements performed by the UE 110 based on signals provided by a serving cell utilizing the unlicensed spectrum. If the UE 110 determines that the LAA RRM measurement requirements are satisfied, the method continues to 420. If the UE 110 determines that the LAA RRM measurement requirements are not satisfied, the method continues to 425.

In 420, the UE 110 does not utilize an active mode of processing to perform LAA measurements during the DMTC occasion. For instance, the UE 110 may determine that since the LAA serving cell measurements are satisfied and LAA neighbor cell measurements are not configured, the UE 110 may remain in a sleep mode based on the C-DRX cycle and not turn on its receiver to listen for control information broadcasted by LAA cells during the DMTC occasion because the UE 110 has nothing left to measure with respect to LAA cells for RRM purposes. Subsequently, the method 400 ends. Since the UE 110 does not utilize an active mode of processing during the subsequent DMTC occasion, the method 400 provides power saving over legacy DMTC monitoring because instead of utilizing an active mode of operation for performing measurements during the DMTC occasion, the UE 110 is may sleep and conserve power.

In 425, the UE 110 listens for LAA serving cell signals during the DMTC occasion. For instance, the UE 110 may tune its receiver to listen for data and/or control information broadcasted or transmitted during the DMTC occasion by the LAA serving cell. The UE 110 may listen for LAA serving cell data and/or control channel information intended for the UE 110 or may listen for data and/or control information intended for other UEs.

In 430, the UE 110 determines that LAA RRM measurement requirements are satisfied. This may be the same determination made in 415. However, instead of being based on control information and/or data received during the onDuration, this determination may be based on control information and/or data received during the DMTC occasion. When the LAA RRM measurement requirements are satisfied the UE 110 may cease utilization of the active mode of processing before the completion of the DMTC occasion. For instance, consider a DMTC occasion with six subframes. If the UE 110 determines that LAA RRM measurement requirements are satisfied based on the first subframe of the DMTC occasion, the UE 110 may turn off its receiver and stop listening for LAA serving cell control channel information for the remaining five subframes of the DMTC occasion. Thus, the UE 110 may selectively forgo listening for control channel information during the remaining five subframes of the DMTC occasion. In a second example, if the UE 110 determines that LAA RRM measurement requirements are satisfied based on the third subframe, the UE 110 may turn off its receiver and stop listening for LAA serving cell control channel information for the remaining three subframes of the DMTC occasion. Thus, the UE 110 may selectively forgo listening for control channel information during the remaining three subframes of the DMTC occasion. Subsequently, the method 400 ends. Since the UE 110 does not utilize an active mode of processing during the entirety DMTC occasion, the method 400 provides power saving over legacy DMTC monitoring because instead of utilizing an active mode of operation for performing measurements during the entirety of the DMTC occasion, the UE 110 may limit its active mode of processing to a number of subframes that is less than the duration of the DMTC occasion. How the UE 110 performs measurements of the LAA serving cell during the DMTC occasion to limit its active processing time will be discussed in further detail below with regard to the method 700.

Figure 5:
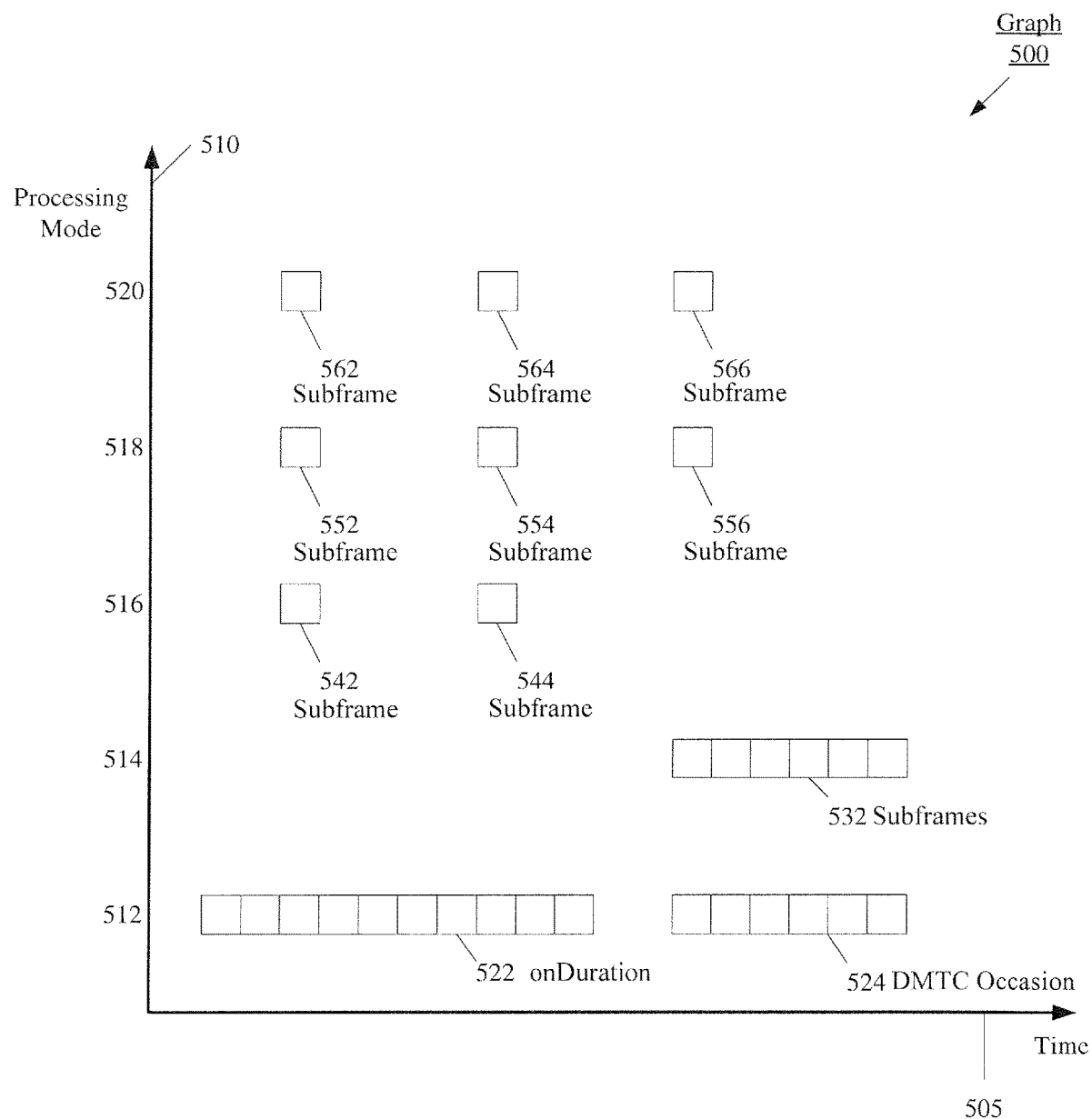
FIG. 5 shows a graph that provides examples of when the UE is in an active mode of processing according to various exemplary embodiments described herein.

FIG. 5 shows a graph 500 that provides examples of when the UE 110 is in an active mode of processing according to various exemplary embodiments. Specifically, the graph 500 demonstrates when the UE 110 is in an active mode of processing based on the execution of the method 400 with respect to exemplary scenarios. The graph 500 will be described with reference to the network arrangement 100, the UE 110 and the method 400.

The x-axis 505 of the graph 500 represents time. The y-axis 510 provides point 512 that relates to when the UE 110 is configured with the onDuration 522 and the DMTC occasion 524. For instance, the duration of the onDuration 522 and the DMTC occasion 524 are represented by the blocks plotted along the x-axis 505 at point 512. Each block represents a subframe. Thus, the graph 500 illustrates an onDuration of ten subframes and a DMTC occasion of six subframes.

The y-axis 510 provides point 514 that relates to when the UE 110 utilizes an active mode of processing to perform measurements related to LAA cells according to the legacy mode of DMTC monitoring. For instance, the blocks plotted along the x-axis 505 at point 514 demonstrate six subframes 532 where the UE 110 is in an active mode of processing for measurements related to LAA cells. Thus, in the legacy mode of DMTC monitoring the UE 110 is utilizing an active mode of processing to perform measurements related to LAA cells for the entirety of the six subframes that occur during the DTMC occasion 524.

Consider a scenario where the LAA serving cell DRS is received in the first subframe of the six subframes 532 and LAA neighbor cell measurement is not configured for the UE 110. In this scenario, the UE 110 may perform RRM measurements on the LAA serving cell based on the DRS in the first subframe. The UE 110 will not derive any measurements related to cells that utilize the unlicensed spectrum in the remaining five subframes because, with respect to RRM measurements, the UE 110 is configured to only perform measurements with regard to the LAA serving cell. However, in the legacy mode of operation the UE 110 will remain in an active mode of processing for measurements related to LAA for the entirety of the six subframes 532, despite only utilizing the DRS received during the first subframe.

The y-axis 510 provides point 516 that relates to an example of when the UE 110 utilizes an active mode of processing to perform measurements related to LAA cells based on the method 400. Specifically, the blocks plotted along the x-axis 505 at point 516 of the y-axis provide an example of when the UE 110 determines that LAA RRM measurement requirements are satisfied during 415. In this example, the UE 110 enabled LAA serving cell measurement during a first subframe 542 and during a second subframe 544 that occur during the onDuration 522.

Consider a scenario where the LAA serving cell is transmitting downlink traffic (e.g. control information and/or data) to the UE 110 during the second subframe 542 and the UE 110 is not configured to perform LAA neighbor cell measurements. In this scenario, initially, the UE 110 may utilize an active mode of processing to perform LAA related measurements in the first subframe 542. Since the UE 110 does not detect any control channel information and/or data from the LAA serving cell during the first subframe 542 the UE 110 is may not perform any measurements related to RRM. Subsequently, the UE 110 does not utilize an active mode of processing for measurements related to LAA until the second subframe 544. As mentioned above, during the second subframe 544, the LAA serving cell transmitted control channel information and/or data to the UE 110. Since the UE 110 is in an active mode of processing to perform measurements for the LAA serving cell, the UE 110 may detect LAA serving cell signals and derive measurements based on the control channel information and/or data that is transmitted to the UE 110 by the LAA serving cell during the second subframe 544. Based on these measurements, the UE 110 may determine that the LAA RRM measurement requirements are satisfied. Accordingly, the UE 110 may forgo the entirety of the DMTC occasion and thus, conserve power because no further RRM measurements related to LAA are required. Thus, in this scenario, the UE 110 may sleep for the entirety of the DMTC occasion 524.

The y-axis 510 provides point 518 that relates to another example of when the UE 110 utilizes an active mode of processing to perform measurements related to LAA cells based on the method 400. Specifically, the blocks plotted along the x-axis 505 at point 518 of the y-axis provide an example of when the UE 110 determines that LAA RRM measurement requirements are satisfied during 430. In this example, the UE 110 enabled LAA serving cell measurement during a first subframe 552 and during a second subframe 554 that occur during the onDuration 522 and a third subframe 556 that occurs during the DMTC occasion 524.

Consider a scenario where the LAA serving cell is not transmitting any downlink traffic (e.g. control information and/or data) to the UE 110 or other UEs during the first subframe 552 or the second subframe 554 and the UE 110 is not configured to perform LAA neighbor cell measurements. Further consider the LAA serving cell broadcasts DRS during the third subframe 554. Unlike the example provided by the point 516, the UE 110 was unable to detect any control information and/or data from the LAA serving cell to either the UE 110 or other UEs that the LAA serving cell is communicating with during the first subframe 552 or the second subframe 554 that coincide with the onDuration 522. Thus, when the DMTC occasion 524 occurs the UE 110 may utilize an active mode of processing to perform measurements for LAA RRM measurements starting at the third subframe 554 which is the first subframe of the DMTC occasion 524. Since the LAA serving cell is broadcasting the DRS during the third subframe 556 and the UE 110 is in an active mode of processing to perform measurements during the third subframe 556 the UE 110 may detect the DRS and perform measurements. Based on these measurements, the UE 110 may determine that the LAA RRM measurement requirements are satisfied. Accordingly, the UE 110 may forgo the remaining five subframes of the DMTC occasion 524 and thus, conserve power because no further RRM measurements related to LAA are required.

The y-axis 510 provides point 520 that relates to another example of when the UE 110 utilizes an active mode of processing to perform measurements related to LAA cells based on the method 400. Specifically, the blocks plotted along the x-axis 505 at point 520 of the y-axis provide an example of when the UE 110 determines that LAA RRM measurement requirements are satisfied during 430. In this example, the UE 110 enabled LAA serving cell measurement during a first subframe 562 and during a second subframe 564 that occur during the onDuration 522 and a third subframe 566 that occurs during the DMTC occasion 524.

Consider a scenario where the LAA serving cell is not transmitting any downlink traffic (e.g. control information and/or data) to the UE 110 or other UEs during the first subframe 562 or the second subframe 564 and the UE 110 is not configured to perform LAA neighbor cell measurements. Further consider the LAA serving cell broadcasts DRS during a subframe subsequent to the third subframe 554. In contrast to the example provided by the point 518, downlink traffic (e.g. control information and/or data) intended for another UE occurs during the third subframe 564. Further, unlike the example provided by the point 516, the UE 110 was unable to detect any control information and/or data from the LAA serving cell to either the UE 110 or other UEs that the LAA serving cell is communicating with during the first subframe 562 or the second subframe 564. Thus, when the DMTC occasion 524 occurs the UE 110 may utilize an active mode of processing to perform measurements starting at the third subframe 564 which is the first subframe of the DMTC occasion 524. Since the LAA serving cell is transmitting downlink traffic to another UE during the third subframe 564 and the UE 110 is in an active mode of processing to perform measurements during the third subframe 566 the UE 110 may detect the LAA serving cell signals and perform measurements during the third subframe 566. Based on these measurements, the UE 110 may determine that the LAA RRM measurement requirements are satisfied. Since the LAA serving cell measurements are already performed the UE 110 does not need to detect and measure the DRS transmitted in the subframe subsequent to the third subframe 566. Accordingly, the UE 110 may forgo the remaining five subframes of the DMTC occasion 524 and thus, conserve power because no further RRM measurements related to LAA are required.

It should be noted that the graph 500 is only provided for illustrative purposes. The method 400 may be configured to monitor any particular subframe within either the onDuration or the DMTC occasion. Further, the exemplary embodiments may apply to any configuration of network traffic.

Figure 6:
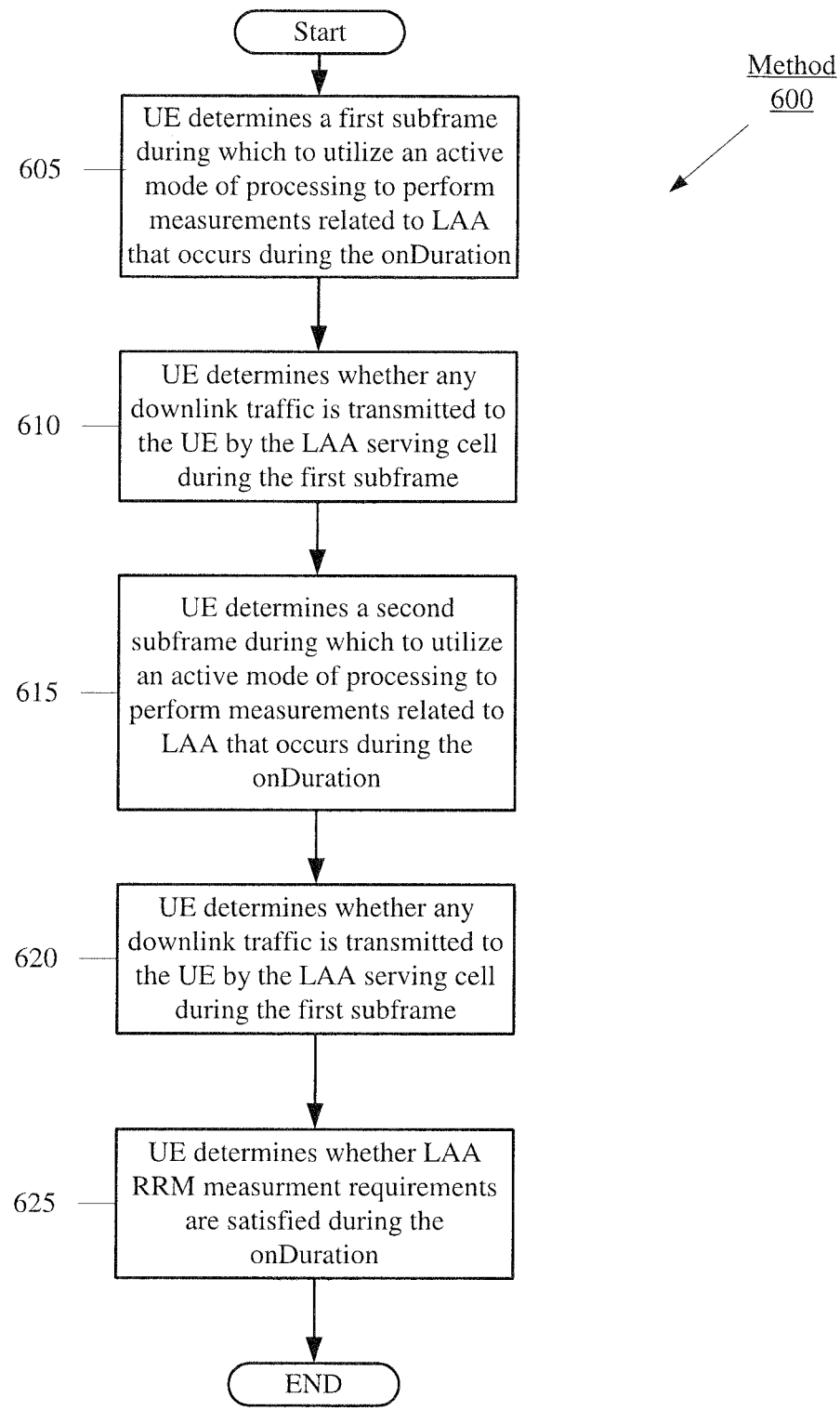
FIG. 6 shows a method for the UE to determine whether LAA RRM requirements are satisfied based on the onDuration according to various exemplary embodiments described herein.

FIG. 6 shows a method 600 for the UE 110 to determine whether LAA RRM requirements are satisfied based on the onDuration according to various exemplary embodiments. The method 600 relates to the determination made in 415 of the method 400. The method 600 will be described with regard to the network arrangement 100, the UE 110 and the method 400.

In 605, the UE 110 determines a first subframe during which to utilize an active mode of processing to perform measurements related to LAA that occurs during an onDuration. For instance, as mentioned above, consider that the network utilizes a frame containing subframe 0-9 to transmit or broadcast control channel information and/or data. The UE 110 may be configured to utilize an active mode of processing to perform measurements related to LAA during any subframe 0 of a frame that is transmitted during the onDuration. It should be noted that use of subframe 0 is merely provided for illustrative purposes, the UE 110 may utilize any subframe or any duration of time to utilize an active mode of processing to perform measurements related to LAA.

In 610, the UE 110 determines whether any downlink traffic (e.g. control channel information and/or data) is transmitted to the UE 110 by the LAA serving cell (e.g. SCell 120B) during the first subframe. The UE 110 may also determine whether any downlink traffic is transmitted to any other UEs by the LAA serving cell (SCell 120B) during the first subframe. This determination may be made based on the UE 110 utilizing an active mode of processing and tuning its receiver to listen for control channel information and/or data transmitted by the LAA serving cell. If the UE 110 detects any downlink traffic by the LAA serving cell, the UE 110 may perform measurements related to LAA RRM based on the detected traffic. However, due to a variety of factors the UE 110 may not detect any data. The factors may include, but are not limited to, the dynamic nature of the unlicensed spectrum, interference, no transmission being performed by the LAA serving cell, subframe shifting, etc.

In 615, the UE 110 determines a second subframe during which to utilize an active mode of processing to perform measurements related to LAA that occurs during an onDuration. For instance, the UE 110 may be configured to utilize an active mode of processing to perform measurements related to LAA during any subframe 5 of a frame that is transmitted during the onDuration. It should be noted that use of subframe 5 is merely provided for illustrative purposes, the UE 110 may utilize any subframe or any duration of time to utilize an active mode of processing to perform measurements related to LAA. Thus, based on 605 and 615 the UE 110 may be configured to utilize an active mode of processing to perform measurements related to LAA during the subframe 0 and the subframe 5 of any frame that is transmitted during the onDuration. It should be noted that reference to subframe 0 and subframe 5 of a frame is merely provided for illustrative purposes, the exemplary embodiments of the method 600 may apply to any subframe or any duration of time within the onDuration. Further, it should be noted that if the UE 110 detects downlink traffic in the first subframe the UE 110 may forgo utilizing the active mode of processing to perform measurements during the second subframe.

In 620, the UE 110 determines whether any downlink traffic (e.g. control channel information and/or data) is transmitted to the UE 110 by the LAA serving cell (e.g. SCell 120B) during the second subframe. The UE 110 may also determine whether any downlink traffic is transmitted to any other UEs by the LAA serving cell (SCell 120B) during the second subframe. This determination may be made based on the UE 110 utilizing an active mode of processing and tuning its receiver to listen for control channel information and/or data transmitted by the LAA serving cell. If the UE 110 detects any downlink traffic by the LAA serving cell, the UE 110 may perform measurements related to LAA RRM based on the detected traffic.

In 625, the UE 110 determines whether LAA RRM requirements are satisfied during the onDuration. LAA RRM measurement requirements may include factors such as but not limited to, reference signal received power (RSRP), reference signal received quality (RSRQ), CSI-RS based RSRP measurements and measurements based on PSS and SSS. A single factor or a combination of factors may provide the basis for a predetermined condition related to RRM measurement requirements. Satisfaction of the predetermined condition may indicate to the UE 110 that LAA RRM measurement requirements are satisfied. It should be noted that these types of measurements are merely provided for illustrative purposes. RRM measurement requirements may be carrier specific and different networks may refer to similar measurements in a different manner. The exemplary embodiments may apply to any measurements performed by the UE 110 based on signals provided by a serving cell utilizing the unlicensed spectrum. If the UE 110 determines that the LAA RRM measurement requirements are satisfied the UE 110 may forgo utilizing an active mode of processing to perform measurements during a subsequent DMTC occasion that occurs outside of the onDuration. If the UE 110 determines that the LAA RRM measurements are not satisfied, the UE 110 may determine to proceed to method 700. However, proceeding to method 700 is not required and the UE 110 may determine to operate in accordance with the legacy mode of DMTC monitoring.

Figure 7:
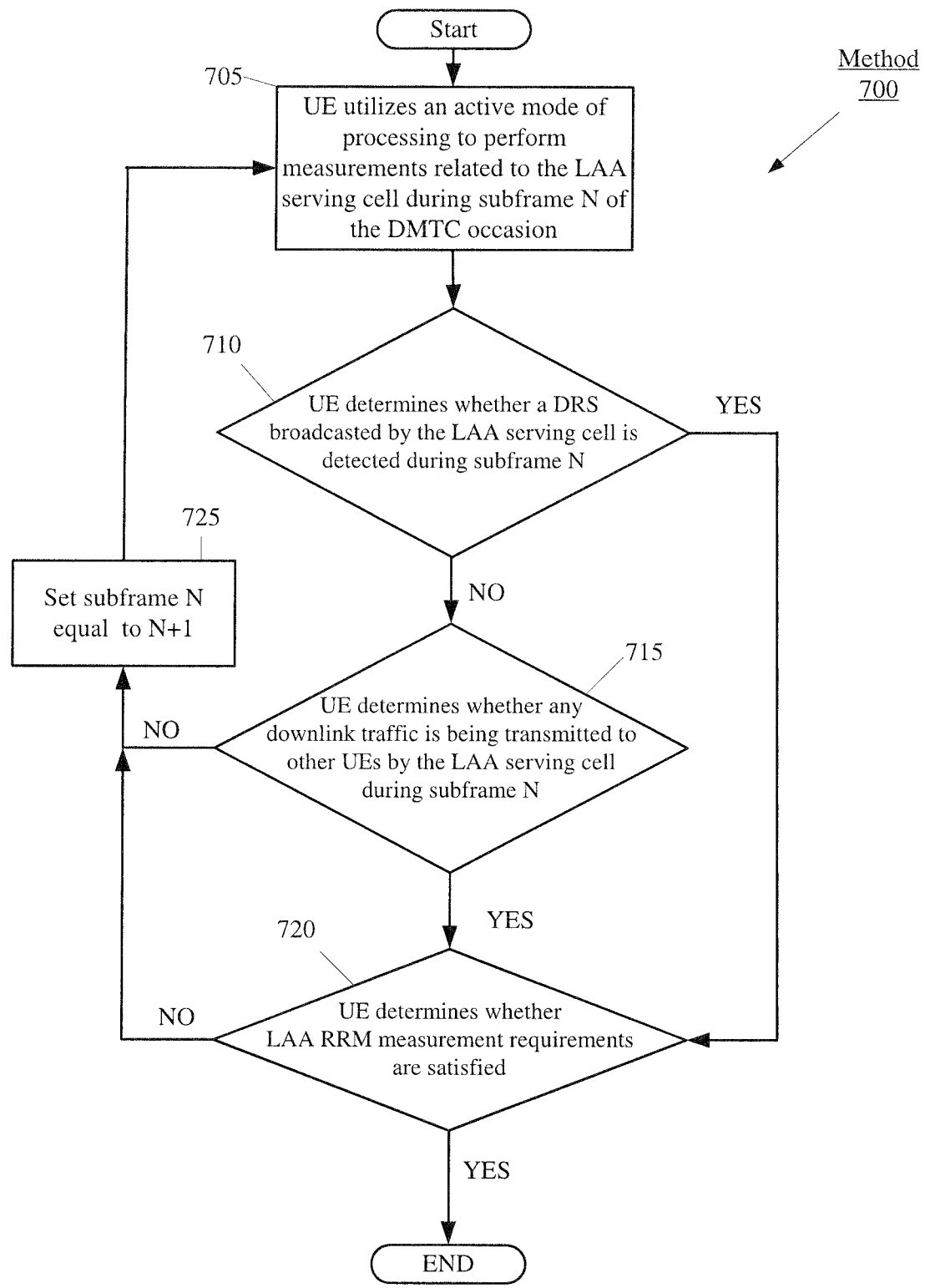
FIG. 7 shows a method for the UE to determine whether LAA RRM requirements are satisfied based on the DMTC occasion according to various exemplary embodiments described herein.

FIG. 7 shows a method 700 for the UE 110 to determine whether LAA RRM requirements are satisfied based on the DMTC occasion according to various exemplary embodiments. The method 700 relates to the determination made in 430 of the method 400. The method 700 will be described with regard to the network arrangement 100, the UE 110 and the method 400.

Consider that the UE 110 is configured with a DMTC occasion that occurs outside of an onDuration and has a duration of six subframes. Further consider that the UE 110 is not configured with LAA neighbor cell measurements.

In 705, the UE 110 utilizes an active mode of processing to perform measurements related to the LAA serving cell during the first subframe of the DMTC occasion. For instance, the UE 110 may tune its receiver to listen for control channel information and/or data transmitted by the LAA serving cell during the first subframe (e.g. subframe N) of the DMTC occasion.

In 710, the UE 110 determines whether a DRS broadcasted by the LAA serving cell is detected during the first subframe of the DMTC occasion. However, this is merely exemplary. The UE 110 may be configured to monitor for DRS broadcasted by the LAA serving cell during any subframe of the DMTC occasion. If the UE 110 detects the DRS during the first subframe (e.g. subframe N), the method 700 continues to 720 where the UE 110 determines whether the LAA RRM measurement requirements are satisfied. When LAA RRM measurement requirements are satisfied, the UE 110 may forgo utilizing the active mode of processing for the remaining five subframes of the DMTC occasion. If the UE 110 does not detect the DRS in the first subframe, the method 700 continues to 715.

In 715, the UE 110 determines whether any downlink traffic is being transmitted to other UEs by the LAA serving cell during the first subframe of the DMTC occasion. If the UE 110 detects downlink traffic being transmitted to other UEs during the first subframe (e.g. subframe N), the method 700 continues to 720 where the UE 110 determines whether the LAA RRM measurement requirements are satisfied. When LAA RRM measurement requirements are satisfied, the UE 110 may forgo utilizing the active mode of processing for the remaining five subframes of the DMTC occasion. If the UE 110 does not detect downlink traffic transmitted by the LAA serving cell to other UEs, the method 700 continues to 725 where subframe N may be set equal to N+1. Subsequently, the method 700 may be performed based on the second subframe of the DMTC occasion (e.g. subframe N+1).

In 720, the UE 110 determines whether the LAA RRM measurement requirements are satisfied. For instance, the UE 110 may perform LAA RRM measurements based on either detecting DRS broadcasted by the LAA serving cell during the first subframe in 710 or detecting downlink traffic transmitted to other UEs by the LAA serving cell during the first subframe in 715. Based on the LAA RRM measurements performed on either the detected DRS or the detected downlink traffic to other UEs the UE 110 may determine that LAA RRM measurement requirements are satisfied. As mentioned above, LAA RRM measurements may include factors such as but not limited to, reference signal received power (RSRP), reference signal received quality (RSRQ), CSI-RS based RSRP measurements and measurements based on PSS and SSS. A single factor or a combination of factors may provide the basis for a predetermined condition related to RRM measurement requirements. When the LAA RRM measurement requirements are satisfied based on the first subframe (e.g. subframe N), the method 700 ends and the UE 110 may forgo utilizing the active mode of processing to perform measurements related to LAA RRM for the remaining five subframes. When the LAA RRM measurement requirements are not satisfied, the method 700 continues to 725.

In 725, subframe N may be set equal to N+1. Subsequently, the method 700 is performed based on the second subframe of the DMTC occasion (subframe N+1). For instance, if the UE 110 is unable to detect a DRS broadcasted by the LAA serving cell during the first subframe in 710 and the UE 110 is unable to detect downlink traffic transmitted by the LAA serving cell during the first subframe in 715, the LAA RRM measurement requirements may not be satisfied based on the first subframe. Subsequently, the method 700 may repeat for the second subframe of the DMTC occasion (e.g. subframe N+1). If the UE 110 determines that the LAA RRM measurement requirements are satisfied based on second subframe, the UE 110 may forgo utilizing the active mode of processing to perform measurements related to LAA for the remaining four subframes. If the UE 110 determines that the LAA RRM measurement requirements are not satisfied based on the second subframe, the method 700 may repeat for the third subframe of the DMTC occasion (e.g. subframe N+2). The method 700 may continue until either the LAA RRM requirements are satisfied or the DMTC occasion ends.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed:

1. A method, comprising:
  at a user equipment (UE) connected to a primary cell of a network, the UE and the network configured with a Connected Discontinuous Reception (C-DRX) functionality, the C-DRX functionality including a cycle with at least one onDuration, the UE further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by a secondary cell on a frequency band in an unlicensed spectrum, CA in the unlicensed spectrum further including a discovery reference signal (DRS) monitoring timing configuration (DMTC) occasion that occurs outside of the at least one onDuration:
    determining, prior to the DMTC occasion, that a type of neighbor cell measurement in the unlicensed spectrum is not to be performed by the UE during the DMTC occasion;

determining at least one subframe of a first onDuration for the UE to utilize an active mode of processing related to performing at least one measurement corresponding to the secondary cell, wherein the DMTC occasion is subsequent to the first onDuration; and determining to utilize a sleep mode of processing related to performing measurements in the unlicensed spectrum during the DMTC occasion based on detecting a first downlink signal transmitted by the secondary cell during the at least one subframe of the first onDuration and determining that the type of neighbor cell measurement in the unlicensed spectrum is not to be performed by the UE and by tuning a receiver to no longer listen for control channel information during the DMTC, wherein the UE is in the sleep mode of processing for one or more subframes of the DMTC and does not receive control channel information when in the sleep mode of processing.

2. The method of claim 1, wherein a duration of the at least one subframe of the first onDuration is less than a duration of the first onDuration.

3. The method of claim 1, wherein the first downlink signal transmitted by the secondary cell comprises a signal intended for the UE.

4. The method of claim 1, wherein the first downlink signal transmitted by the secondary cell comprises a signal intended for a further UE.

5. The method of claim 1, wherein the at least one measurement corresponding to the secondary cell is based on radio resource management (RRM).

6. The method of claim 1, wherein the type of neighbor cell measurement is intra-frequency neighbor cell measurement.

7. The method of claim 1, wherein the at least one subframe of the first onDuration includes a first subframe and a second subframe.

8. The method of claim 1, wherein when the first downlink signal transmitted by the secondary cell is not detected during the at least one subframe, utilizing the active mode of processing related to performing the at least one measurement corresponding to the secondary cell during the DMTC occasion, wherein performing the at least one measurement corresponding to the secondary cell during the DMTC occasion includes, monitoring a first subframe of the DMTC occasion for a DRS broadcasted by the secondary cell;

monitoring the first subframe of the DMTC occasion for a second downlink signal transmitted by the secondary cell; and when one of the DRS broadcasted by the secondary cell or the second downlink signal transmitted by the secondary cell is detected during the first subframe of the DMTC occasion, initiating the sleep mode of processing related to performing the at least one measurement corresponding to the secondary cell for the remaining subframes of the DMTC occasion.

9. The method of claim 8, wherein when one of the DRS broadcasted by the secondary cell or the second downlink signal transmitted by the secondary cell is not detected during the first subframe of the DMTC occasion, monitoring a second subframe of the DMTC occasion for a DRS broadcasted by the secondary cell;

monitoring the second subframe of the DMTC occasion for the second downlink signal transmitted by the secondary cell; and when one of the DRS broadcasted by the secondary cell or the second downlink signal transmitted by the secondary cell is detected during the second subframe of the DMTC occasion, initiating the sleep mode of processing related to performing the at least one measurement corresponding to the secondary cell for the remaining subframes of the DMTC occasion.

10. A method, comprising:

at a user equipment (UE) connected to a primary cell of a network, the UE and the network configured with a Connected Discontinuous Reception (C-DRX) functionality, the C-DRX functionality including a cycle with at least one onDuration, the UE further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by a secondary cell on a frequency band in an unlicensed spectrum, CA in the unlicensed spectrum further including a discovery reference signal (DRS) monitoring timing configuration (DMTC) occasion that occurs outside of the at least one onDuration:

determining, prior to the DMTC occasion, that a type of neighbor cell measurement in the unlicensed spectrum is not to be performed by the UE during the DMTC occasion;

detecting one of a DRS broadcasted by the secondary cell or a downlink signal transmitted by the secondary cell during a first subframe of the DMTC occasion; and initiating a sleep mode of processing related to performing measurements in the unlicensed spectrum during the DMTC occasion based on detecting the one of the DRS or the downlink signal during the first subframe and determining the type of neighbor cell measurement in the unlicensed spectrum is not to be performed by the UE, and by tuning a receiver to no longer listen for control channel information during the DMTC, wherein the UE is in the sleep mode of processing for one or more subframes of the DMTC and does not receive control channel information when in the sleep mode of processing.

11. The method of claim 10, wherein detecting one of a DRS broadcasted by the SCC or the downlink signal transmitted by the secondary cell comprise determining whether a predetermined condition has been satisfied, wherein the predetermined condition is based on performing radio resource management (RRM) measurements.

12. The method of claim 11, wherein the RRM measurements include at least one of a reference signal received power (RSRP) or a reference signal received quality (RSRQ).

13. The method of claim 10, wherein when the one of the DRS broadcasted by the secondary cell or the downlink signal transmitted by the secondary cell is not detected during the first subframe, monitoring a second subframe of the DMTC occasion for a DRS broadcasted by the secondary cell;

monitoring the second subframe of the DMTC occasion for the second downlink signal transmitted by the secondary cell; and when one of the DRS broadcasted by the secondary cell or the second downlink signal transmitted by the secondary cell is detected during the second subframe of the DMTC occasion, initiating the sleep mode of processing related to performing the at least one measurement corresponding to the secondary cell for the remaining subframes of the DMTC occasion.

14. The method of claim 10, wherein the network is an LTE network.

15. The method of claim 10, wherein the primary cell is an Evolved Node B (eNB).

16. A user equipment (UE) comprising:
a transceiver configured to establish a connection to a primary cell of a network, the UE and the network configured with a Connected Discontinuous Reception (C-DRX) functionality, the C-DRX functionality including a cycle with at least one onDuration, the UE further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by a secondary cell on a frequency band in an unlicensed spectrum, CA in the unlicensed spectrum further including a discovery reference signal (DRS) monitoring timing configuration (DMTC) occasion that occurs outside of the at least one onDuration; and
a processor configured to perform operations including:
determining, prior to the DMTC occasion, that a type of neighbor cell measurement in the unlicensed spectrum is not to be performed by the UE during the DMTC occasion;
determining at least one subframe of a first onDuration for the UE to utilize an active mode of processing related to performing at least one measurement corresponding to the secondary cell, wherein the DMTC occasion is subsequent to the first onDuration; and
determining to utilize a sleep mode of processing related to performing the measurements in the unlicensed spectrum during the DMTC occasion based on detecting a first downlink signal transmitted by the secondary cell during the at least one subframe of the first onDuration and determining the type of neighbor cell measurement in the unlicensed spectrum is not to be performed by the UE, and by tuning a receiver to no longer listen for control channel information during the DMTC, wherein the UE is in the sleep mode of processing for one or more subframes of the DMTC and does not receive control channel information when in the sleep mode of processing.

17. The UE of claim 16, wherein when the first downlink signal transmitted by the secondary cell is not detected during the at least one subframe, utilizing the active mode of processing related to performing the at least one measurement corresponding to the secondary cell during the DMTC occasion, wherein performing the at least one measurement corresponding to the secondary cell during the DMTC occasion includes,
monitoring a first subframe of the DMTC occasion for a second downlink signal transmitted by the secondary cell; and
when the second downlink signal transmitted by the secondary cell is detected during the first subframe of the DMTC occasion, initiating the sleep mode of processing related to performing the at least one measurement corresponding to the secondary cell for the remaining subframes of the DMTC occasion.

18. The UE of claim 17, wherein the second downlink signal is a signal intended for a further UE.

19. A user equipment (UE) comprising:
a transceiver configured to establish a connection to a primary cell of a network, the UE and the network configured with a Connected Discontinuous Reception (C-DRX) functionality, the C-DRX functionality including a cycle with at least one onDuration, the UE further configured with carrier aggregation (CA) in an unlicensed spectrum, CA in the unlicensed spectrum including a primary component carrier (PCC) served by the primary cell on a frequency band in the licensed spectrum and a secondary component carrier (SCC) served by a secondary cell on a frequency band in an unlicensed spectrum, CA in the unlicensed spectrum further including a discovery reference signal (DRS) monitoring timing configuration (DMTC) occasion that occurs outside of the at least one onDuration; and
a processor configured to perform operations including:
determining, prior to the DMTC occasion, that a type of neighbor cell measurement in the unlicensed spectrum is not to be performed by the UE during the DMTC occasion;
detecting one of a DRS broadcasted by the secondary cell or a downlink signal transmitted by the secondary cell during a first subframe of the DMTC occasion; and
initiating a sleep mode of processing related to performing measurements in the unlicensed spectrum during the DMTC occasion based on detecting the one of the DRS or the downlink signal during the first subframe and determining the type of neighbor cell measurement in the unlicensed spectrum is not to be performed by the UE and by tuning a receiver to no longer listen for control channel information during the DMTC, wherein the UE is in the sleep mode of processing for one or more subframes of the DMTC and does not receive control channel information when in the sleep mode of processing.

20. The UE of claim 19, wherein the downlink signal transmitted by the secondary cell comprises a signal intended for a further UE.

* * * * *